US006998133B2

(12) United States Patent
Simpson

(10) Patent No.: US 6,998,133 B2
(45) Date of Patent: Feb. 14, 2006

(54) ADHESIVE DEVICE FOR CAPTURING INSECTS

(75) Inventor: Arthur W. Simpson, Honolulu, HI (US)

(73) Assignee: Integrated Pest Management Technologies, Inc., Honolulu, HI (US)

( * ) Notice: Subject to any disclaimer, the term of this patent is extended or adjusted under 35 U.S.C. 154(b) by 179 days.

(21) Appl. No.: 10/318,548

(22) Filed: Dec. 12, 2002

(65) Prior Publication Data

US 2004/0115235 A1    Jun. 17, 2004

(51) Int. Cl.
    *A01N 25/10*    (2006.01)
(52) U.S. Cl. ............... 424/409; 43/107; 43/114; 43/117; 424/403; 424/405; 424/406; 424/407; 424/411; 424/412; 424/413; 424/77; 424/84
(58) Field of Classification Search ............... 424/403, 424/405–407, 411–413, 77, 84, 409; 43/107, 43/114–117
    See application file for complete search history.

(56) References Cited

U.S. PATENT DOCUMENTS

| 4,411,093 A | * | 10/1983 | Stout et al. ............... 43/114 |
| 4,855,133 A | * | 8/1989 | Kamei et al. ............... 424/84 |
| 5,142,817 A | * | 9/1992 | Rolf ............... 47/32.5 |
| 6,493,986 B1 | * | 12/2002 | Nelson et al. ............... 43/113 |

OTHER PUBLICATIONS

Webster's New World Dictionary □□□□□mirror 1988.*

* cited by examiner

*Primary Examiner*—Neil S. Levy
(74) *Attorney, Agent, or Firm*—Myers Dawes Andras & Sherman LLP; Vic Lin

(57) ABSTRACT

An adhesive device for capturing insects includes a thin main body with a mirrored, operative surface upon which an adhesive material is disposed for capturing insects upon contact. The mirrored surface provides a reflection similar to water so as to attract insects, such as mosquitoes, which are naturally drawn toward water. The device may include one or more insect attractants such as odors, pheromones, food, blood, urine, glow-in-the-dark materials and glitter. An opposite surface includes additional adhesive material for affixing the device to an object, surface or area where usage is desired.

18 Claims, 1 Drawing Sheet

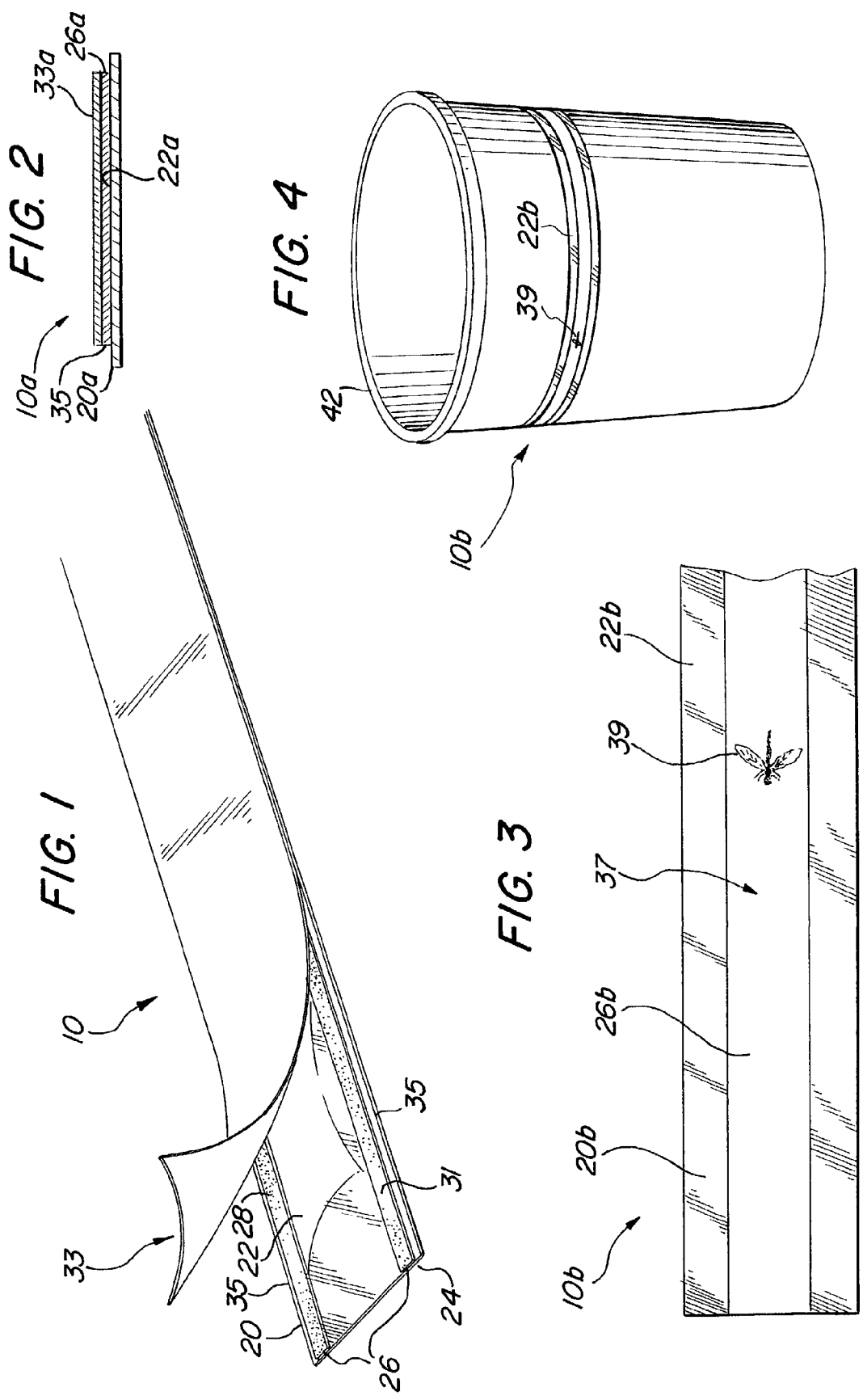

ADHESIVE DEVICE FOR CAPTURING INSECTS

BACKGROUND OF THE INVENTION

1. Field of the Invention

The invention relates generally to pest control and, more particularly, to insect control.

2. Description of Prior Art and Related Information

Being able to cheaply and effectively eliminate insects has always been generally desirable. Due to the resurgence of malaria and the increasing deaths caused by West Nile Fever, it has become increasingly important to exterminate insects such as mosquitoes which carry such diseases.

Conventional devices include electrical contraptions that draw insects with light toward a heat source. In addition to the cost of the device itself, its usage requires a constant supply of electricity which can be expensive over an extended period of time. Furthermore, such devices generally function at night when it is dark and the insects are drawn toward the bright light. These devices are thus ineffective during the daytime. Such devices may also be impractical in certain outdoor areas where there is no access to electricity.

SUMMARY OF THE INVENTION

In accordance with the present invention, structures and associated methods are disclosed which address these needs.

In one aspect, an insect capturing device is provided. The device comprises a main body having a first mirrored surface and a second opposite surface. An adhesive material is disposed on the first mirrored surface and adapted to capture the insect upon contact. The adhesive material disposed on the first mirrored surface is a first adhesive material. The device further comprises a second adhesive material disposed on the second surface. The device further comprises a release liner releasably covering the adhesive material.

The adhesive material may be transparent, translucent, or opaque. The adhesive material may cover a portion or substantially all of the first mirrored surface. The adhesive material is non-poisonous. The device further comprises an insect attractant. The insect attractant may comprise an odor, pheromones, food, blood, urine, luminescent material, and/or glitter. The insect attractant may be included in the adhesive material. The device may also comprise a silhouette decoy disposed on the first reflective surface. The main body may comprise a thin, flexible, elongated strip.

In another aspect, an insect capturing tape is provided. The tape comprises a first aqueously reflective surface, a second opposite surface, a first adhesive material disposed on the first reflective surface and adapted to capture an insect upon contact, and a second adhesive material disposed on the second opposite surface and adapted to affix the tape to an external object. The tape further comprises an insect attractant. A release liner releasably covers the first adhesive material. The first adhesive material is non-poisonous.

In a further aspect, a method is provided for capturing insects. The method comprises providing a reflective surface resembling water, luring an insect toward an adhesive material with the reflective surface, and capturing the insect with the adhesive material. The method may also comprise luring the insect toward the adhesive material with an insect attractant, covering the adhesive material with a releasable liner, providing an adhesive surface opposite the reflective surface, and coupling the adhesive surface to an external object.

The invention, now having been briefly summarized, may be better visualized by turning to the following drawings wherein like elements are referenced by like numerals.

BRIEF DESCRIPTION OF THE DRAWINGS

FIG. 1 is a perspective view of a preferred embodiment of an insect capturing device;

FIG. 2 is a transverse cross-sectional view of a second preferred embodiment of an insect capturing device;

FIG. 3 is a plan view of a third embodiment of an insect capturing device; and

FIG. 4 is a perspective view of a preferred insect capturing device coupled to a trash can.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

A preferred embodiment of an insect capturing device is illustrated in FIG. 1 and designated generally by the reference numeral 10. The device 10 may be used for a variety of insects, but is particularly directed at capturing mosquitoes and other insects which are naturally drawn toward water. In the preferred embodiments, the device 10 is configured as a tape that may be adhered to an external object as described in further detail below.

In FIG. 1, the device 10 comprises a flexible, flat body 20. In a preferred embodiment, the main body 20 is formed as an elongate strip. While the main body 20 may be formed as an elongate strip, it is to be expressly understood that the body 20 may be formed in any particular configuration so as to provide the desired surface area. For example, the body 20 may be configured to provide a substantially rectangular or circular surface area, in which case the body 20 would serve as a sheet rather than a strip. The body, or backing, 20 comprises a first, operative surface 22 and a second, opposite surface 24. The operative surface 22 is adapted for capturing insects while the opposite, or back, surface 24 is adapted for affixing the device 10 to an object or area where its usage is desired. The insect capturing surface 22 comprises a mirrored, or reflective, surface that simulates water. In particular, the surface 22 provides a ratio of reflectivity that may be less than or equal to unity. As examples and not by way of limitations, the body 20 may comprise Mylar, (name other materials that provide mirrored surfaces, including the glow-in-the-dark materials) or any flexible material, most notably plastic, with a polished or smooth surface that forms images by reflection, giving a true and clear representation.

Disposed on the operative surface 22 is an adhesive material 26 adapted for capturing insects upon contact, namely, an insect capturing adhesive material. The adhesive material 26 may be transparent, translucent or opaque. The adhesive material 26 may cover a portion or all of the operative surface 22. If the adhesive material 26 is opaque, then the material 26 preferably covers only a portion of the operative surface 22, thereby leaving exposed portions to provide the mirrored effect. Examples of suitable adhesive materials for capturing insects upon contact may include starch based and/or petroleum based adhesives. The adhesive material preferably contains no poisons or insecticides.

The device 10 may also comprise one or more insect attractants, which may come in a variety of forms. For example, the insect attractant may comprise odors, pheromones, chemicals, food, urine and/or anything else to which insects are drawn. The attractant may be mixed in with the adhesive 26 or otherwise disposed on the operative surface 22. In the illustrated embodiment shown in FIG. 1, the adhesive material 26 is provided as two separate areas, or patches, 28, 31 that extend longitudinally with the body 20. In such an embodiment, a first insect attractant adapted for a particular insect may be included with a first bar 28 of adhesive material while a second insect attractant adapted for a different insect is included with the second bar 31. It is to be expressly understood that fewer or greater number of separated areas of adhesive material may be provided to vary the number and types of insects targeted concurrently.

A release liner 33 removably covers, at a minimum, the adhesive areas 28, 31. In the preferred embodiment, side edges 33 of the body 20 are free of adhesive in order to avoid undesirable stickiness when handling the device 10. Such "dry" edges 33 and non-adhesive portions of the operative surface 22 may or may not be covered with the release liner 33.

A second adhesive material substantially covers the back surface 24 and enables the device 10 to be coupled to any object, structure or surface where usage of the device 10 is desired. Where the device 10 is provided as a tape and is thus rolled up, no cover or liner is necessary for the back surface 24. Alternatively, the device 10 may be provided as a sheet in which case a releasable liner may be employed to removably cover the back surface 24.

In a second preferred embodiment 10a shown in FIG. 2, the adhesive material 26a is transparent and formed as a single patch 35 that substantially covers the width "A" of the body 20a. As a result, a greater surface area for capturing insects is provided while still allowing the mirrored surface 22a of the body 20a to reflect sufficiently to draw insects thereto. A release liner 33a removably covers the entire patch 35.

In a third preferred embodiment 10b shown in FIG. 3, the adhesive material 26b is translucent and formed as a single patch 37 that extends longitudinally with the main body 20b. In this embodiment 10b, one or more decoys 39 of various insects may be disposed on the adhesive patch 37 to further draw insects thereto. In addition to providing a mirrored surface 22b, the main body 20b and/or adhesive material may comprise an insect attractant in the form of luminescent material, such as zinc sulfide, conventional phosphorescent pigments, chemical light components or products such as "LUMINOVA." Such glow-in-the-dark materials enables the device 10 to function at night as well as during the day. At night, the glowing effect of the adhesive material 26b will attract insects. As the insects approach, they will also notice the mirrored surface 22b and, thus, desire to come into contact therewith. The insect attractant may also comprise micro-sized reflective material or glitter to give a sparkling effect such as what occurs on the surface of water. Such material is preferably light reflective and may be composed of fine particles such as those widely used in the crafts and cosmetics industries.

FIG. 4 is an operative view of the device 10b. The device 10b is affixed to an external object 42 where usage is desired, shown here as a trash can 42. In particular, the back surface of the device 10b is adhered to the trash can 42 while the front mirrored surface 22b projects outwardly therefrom. In operation, the mirrored surface 22b reflects light in a fashion similar to water so as to attract insects. In addition, one or more insect attractants included in the device 10b further draw insects thereto. Optional decoys 39 may also be employed to increase attraction. The combination of these features provide an irresistible lure to insects, particularly those naturally drawn towards water.

As discussed above, while the illustrated embodiment of the device 10b is shown in the Figures as a strip, it is to be expressly understood that preferred embodiments of the insect capturing device may be provided in any particular configuration so as to vary the shape and size of the mirrored surface area provided by the operative surface of the device. As examples and not by way of limitations, the insect capturing device may be configured as a rectangular or circular sheet.

As a further example, the device may be configured as a rectangular sheet with the mirrored, operative surface substantially coated with a transparent or translucent insect capturing adhesive. The sheet may then be cut by a user to conform to a surface of the object to which the device will be affixed.

It will be appreciated that an effective insect capturing device is provided without using any poisonous or toxic chemicals found in conventional pest control devices. It will further be appreciated that the insect capturing device according to the invention functions during the day and does not require any electricity. With the use of glow-in-dark materials, the insect capturing device may also function at night, thereby providing effective insect control twenty-four hours a day.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. An insect capturing tape device, comprising:
   a main body having a first mirrored surface and a second opposite surface, the first mirrored surface resembling a water surface and providing a mirror image to an insect when in close proximity thereto; and
   a first adhesive material disposed on the first mirrored surface and formulated to capture the insect upon contact; and
   a second adhesive material disposed on the second surface.

2. The device of claim 1, wherein the main body comprises a flexible strip.

3. The device of claim 1, further comprising a release liner releasably covering the adhesive material.

4. The device of claim 1, wherein the adhesive material is transparent.

5. The device of claim 1, wherein the adhesive material is translucent.

6. The device of claim 1, wherein the adhesive material is opaque.

7. The device of claim 1, wherein the adhesive material covers a all of the first mirrored surface.

8. The device of claim 1, wherein the adhesive material is non-poisonous.

9. The device of claim 1, further comprising an insect attractant.

10. The device of claim 9, wherein the insect attractant comprises an odor.

11. The device of claim 9, wherein the insect attractant comprises pheromones.

12. The device of claim 9, wherein the insect attractant comprises food.

13. The device of claim 9, wherein the insect attractant comprises blood.

14. The device of claim 9, wherein the insect attractant comprises urine.

15. The device of claim 9, wherein the insect attractant comprises a luminescent material.

16. The device of claim 9, wherein the insect attractant comprises glitter.

17. The device of claim 9, wherein the insect attractant is included in the adhesive material.

18. The device of claim 1, further comprising a silhouette decoy disposed on the first reflective surface.

* * * * *